US012759403B2

(12) United States Patent
Salter et al.

(10) Patent No.: US 12,759,403 B2
(45) Date of Patent: Oct. 13, 2026

(54) SYSTEMS AND METHODS FOR REDUCING REALIZED SOUND LEVELS ORIGINATING FROM SOUND PRODUCING VEHICLE COMPONENTS

(71) Applicant: FORD GLOBAL TECHNOLOGIES, LLC, Dearborn, MI (US)

(72) Inventors: Stuart C. Salter, White Lake, MI (US); Vyas Shenoy, Canton, MI (US); Brendan Diamond, Grosse Pointe, MI (US); William David Treharne, Ypsilanti, MI (US); John Robert Van Wiemeersch, Novi, MI (US); Ryan O'Gorman, Beverly Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 676 days.

(21) Appl. No.: 17/898,699

(22) Filed: Aug. 30, 2022

(65) Prior Publication Data

US 2024/0066990 A1 Feb. 29, 2024

(51) Int. Cl.

*B60L 1/00* (2006.01)
*B60L 50/60* (2019.01)
*B60L 50/61* (2019.01)

(52) U.S. Cl.

CPC ............... *B60L 1/006* (2013.01); *B60L 50/61* (2019.02); *B60L 50/66* (2019.02)

(58) Field of Classification Search

CPC .......... B60L 1/006; B60L 50/61; B60L 50/66; B60L 2240/34; B60L 1/02; B60L 2240/622; B60L 2270/142; B60L 53/14; B60R 16/02; B60K 25/00; B60W 30/18009; B60W 2300/123

See application file for complete search history.

(56) References Cited

U.S. PATENT DOCUMENTS

| | | | | |
|---|---|---|---|---|
| 6,659,078 | B2 | 12/2003 | Bergeon et al. | |
| 7,024,871 | B2 | 4/2006 | Zhu et al. | |
| 7,231,994 | B2 * | 6/2007 | Buglione | F02N 11/04 180/65.8 |
| 10,549,645 | B2 * | 2/2020 | Zhao | B60L 53/14 |
| 10,946,855 | B2 | 3/2021 | Osella et al. | |

(Continued)

FOREIGN PATENT DOCUMENTS

| | | | | |
|---|---|---|---|---|
| CN | 113665561 B | | 3/2022 | |
| CN | 114109562 A | * | 3/2022 | F01N 1/082 |

(Continued)

*Primary Examiner* — Sihar A Karwan

(74) *Attorney, Agent, or Firm* — David B. Kelley; Carlson, Gaskey & Olds, P.C.

(57) ABSTRACT

Remote power supply systems are provided for motor vehicles. The remote power supply systems may power auxiliary devices separate from the vehicle. Exemplary remote power supply systems may include one or more exportable power outlet boxes that include electrical power outlets for connecting the auxiliary devices. The electrical power outlets may be powered by a generator system of the vehicle. A control module associated with the remote power supply system may command one or more vehicle-specific actions designed to reduce the realized sound level at one or more nearby areas of interest when operating the vehicle in a power generation mode.

20 Claims, 5 Drawing Sheets

(56) References Cited

U.S. PATENT DOCUMENTS

| | | | | |
|---|---|---|---|---|
| 11,192,548 | B2 | 12/2021 | Magolan et al. | |
| 11,338,694 | B1 * | 5/2022 | Peeler | B60L 53/16 |
| 2007/0244610 | A1 * | 10/2007 | Ozick | A47L 11/24 342/417 |
| 2014/0052312 | A1 * | 2/2014 | Stadler | B60S 3/04 701/2 |
| 2015/0226146 | A1 * | 8/2015 | Elwart | F02D 41/042 701/112 |
| 2016/0072420 | A1 | 3/2016 | Stair et al. | |
| 2016/0163302 | A1 * | 6/2016 | Klabunde | H05B 47/12 381/56 |
| 2016/0280085 | A1 * | 9/2016 | Shah | B60L 53/14 |
| 2017/0060127 | A1 * | 3/2017 | Alonso Tabares | B60L 50/52 |
| 2017/0080951 | A1 * | 3/2017 | Grossman | G06F 3/0488 |
| 2017/0158007 | A1 * | 6/2017 | Lavoie | B60D 1/62 |
| 2017/0240058 | A1 * | 8/2017 | Ghebru | B60L 1/00 |
| 2017/0302107 | A1 * | 10/2017 | Saussele | B60L 53/14 |
| 2018/0319491 | A1 * | 11/2018 | Kearney-Fischer | B64C 11/305 |
| 2019/0185158 | A1 * | 6/2019 | Blake | B60L 53/51 |
| 2019/0278897 | A1 * | 9/2019 | Zhang | G07C 5/008 |
| 2020/0156538 | A1 | 5/2020 | Harper et al. | |
| 2020/0164760 | A1 * | 5/2020 | Sohmshetty | B60K 1/04 |
| 2020/0204940 | A1 * | 6/2020 | Kim | G10L 21/0232 |
| 2020/0377072 | A1 * | 12/2020 | Kim | B60K 6/485 |
| 2020/0398824 | A1 * | 12/2020 | Tsujino | B60W 60/0025 |
| 2021/0282613 | A1 * | 9/2021 | Fong | G05D 1/0246 |
| 2023/0202454 | A1 * | 6/2023 | Chen | B60W 10/08 701/22 |
| 2024/0025361 | A1 * | 1/2024 | Salter | B60R 16/03 |

FOREIGN PATENT DOCUMENTS

| | | | | | |
|---|---|---|---|---|---|
| JP | 2011162084 | A | | 8/2011 | |
| JP | 3221454 | U | * | 5/2019 | B60R 16/005 |
| JP | 2020078964 | A | * | 5/2020 | |

* cited by examiner

SYSTEMS AND METHODS FOR REDUCING REALIZED SOUND LEVELS ORIGINATING FROM SOUND PRODUCING VEHICLE COMPONENTS

TECHNICAL FIELD

This disclosure relates generally to motor vehicles, and more particularly to vehicle systems and methods for minimizing vehicle noise pollution during power generation mode when powering auxiliary devices separate from the vehicle.

BACKGROUND

Some motor vehicles include electrical power outlets that can be used to power auxiliary devices or loads separate from the vehicle. The electrical power outlets can be particularly useful for commercial vehicles and work trucks that are often at job sites and other areas that may lack an available grid power source. When at such sites, a user can power tools and other auxiliary devices through the vehicle's electrical power outlets. Some components of the vehicle produce noise when powering the electrical power outlets.

SUMMARY

A motor vehicle according to an exemplary aspect of the present disclosure includes, among other things, an exportable power outlet box including an electrical power outlet, a generator system configured to power the electrical power outlet during a power generation mode of the motor vehicle, and a control module programmed to command the motor vehicle or a user of the motor vehicle to perform a vehicle-specific action for reducing an amount of noise pollution realized at an area of interest near the motor vehicle during the power generation mode.

In a further non-limiting embodiment of the foregoing motor vehicle, the electrical power outlet is movable to a location away from the motor vehicle by unwinding a cord of the exportable power outlet box.

In a further non-limiting embodiment of either of the foregoing motor vehicles, a sensor system is configured to monitor an environment around the motor vehicle.

In a further non-limiting embodiment of any of the foregoing motor vehicles, the sensor system is configured to provide sensor data to the control module for determining when to perform the vehicle-specific action.

In a further non-limiting embodiment of any of the foregoing motor vehicles, the control module is further programmed to determine when the motor vehicle has entered into or is operating within a designated quiet zone based at least on the sensor data.

In a further non-limiting embodiment of any of the foregoing motor vehicles, the control module is further programmed to determine when the motor vehicle has entered into or is operating within the designated quiet zone based at least on noise restriction information received from a web-based server.

In a further non-limiting embodiment of any of the foregoing motor vehicles, the control module is further programmed to determine an intent of the user to operate the motor vehicle in the power generation mode when the motor vehicle is located within the designated quiet zone.

In a further non-limiting embodiment of any of the foregoing motor vehicles, the control module is further programmed to identify the area of interest within the designated quiet zone based at least on the sensor data.

In a further non-limiting embodiment of any of the foregoing motor vehicles, the control module is further programmed to analyze the sensor data in order to distinguish between a sound absorbing object and a sound reflecting object located within the environment.

In a further non-limiting embodiment of any of the foregoing motor vehicles, the control module is further programmed to determine a location and an orientation of the motor vehicle relative to the area of interest.

In a further non-limiting embodiment of any of the foregoing motor vehicles, the control module is further programmed to determine an expected sound contribution of a sound generating component of the motor vehicle relative to the area of interest.

In a further non-limiting embodiment of any of the foregoing motor vehicles, the vehicle-specific action includes reorienting the motor vehicle to a position that is altered relative to the area of interest.

In a further non-limiting embodiment of any of the foregoing motor vehicles, reorienting the motor vehicle to the position that is altered relative to the area of interest includes positioning the sound generating component to face in a direction away from the area of interest.

In a further non-limiting embodiment of any of the foregoing motor vehicles, reorienting the motor vehicle to the position that is altered relative to the area of interest includes moving the motor vehicle to a location that is further away from the area of interest.

In a further non-limiting embodiment of any of the foregoing motor vehicles, the vehicle-specific action includes autonomously reorienting the motor vehicle relative to the area of interest.

In a further non-limiting embodiment of any of the foregoing motor vehicles, the vehicle-specific action includes instructing the user to manually reorient the motor vehicle via an alert.

In a further non-limiting embodiment of any of the foregoing motor vehicles, the vehicle-specific action includes modifying an operation of an engine or a traction battery pack of the motor vehicle during the power generation mode.

In a further non-limiting embodiment of any of the foregoing motor vehicles, the vehicle-specific action includes modifying an operation of an HVAC system of the motor vehicle during the power generation mode.

A motor vehicle according to another exemplary aspect of the present disclosure includes, among other things, an exportable power outlet box including an electrical power outlet, a generator system configured to power the electrical power outlet during a power generation mode of the motor vehicle, and a control module programmed to command a reorientation of the motor vehicle relative to an area of interest in a manner that reduces an amount of noise pollution realized at the area of interest when the motor vehicle is operating in a designated quiet zone.

A method according to another exemplary aspect of the present disclosure includes, among other things, during a power generation mode of a motor vehicle, controlling the motor vehicle, via a control module of a remote power supply system, to perform a vehicle-specific action for reducing an amount of noise pollution realized at an area of interest located near the motor vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes remote power supply systems for motor vehicles. The remote power supply systems may power auxiliary devices separate from the vehicle. Exemplary remote power supply systems may include one or more exportable power outlet boxes that include electrical power outlets for connecting the auxiliary devices. The electrical power outlets may be powered by a generator system of the vehicle. A control module associated with the remote power supply system may command one or more vehicle-specific actions designed to reduce the realized sound level at one or more nearby areas of interest when operating the vehicle in a power generation mode. These and other features of this disclosure are discussed in greater detail in the following paragraphs of this detailed description.

Figure 1:
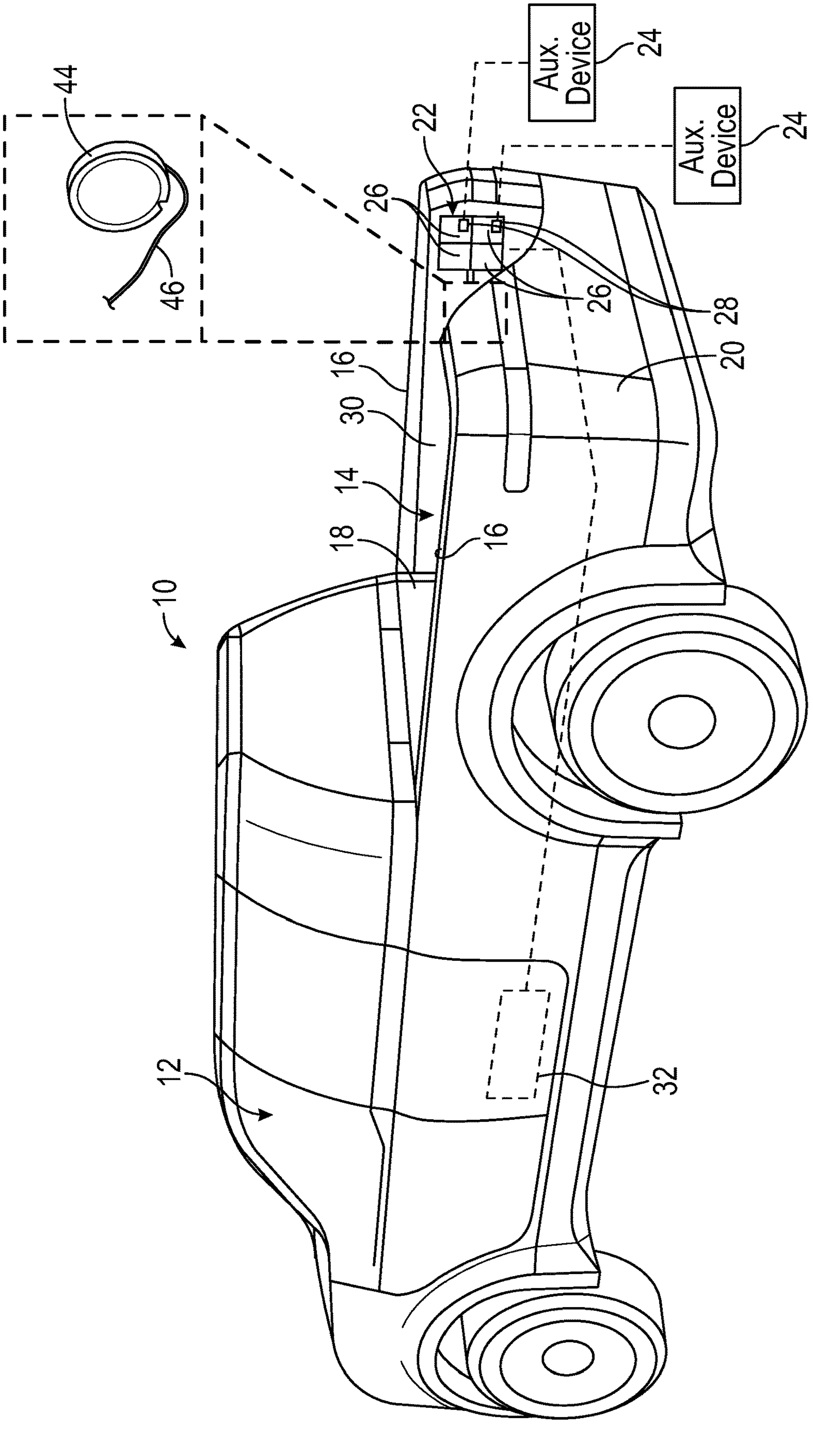
FIG. 1 schematically illustrates a motor vehicle.

FIG. 1 schematically illustrates a motor vehicle 10 that includes a passenger cabin 12 and a cargo space 14 located rearward of the passenger cabin 12. The vehicle 10 could be a conventional, internal combustion engine powered vehicle, a hybrid or plug-in hybrid vehicle, an autonomous vehicle (i.e., a driverless vehicle), etc.

In an embodiment, the vehicle 10 is a pickup truck, and therefore the cargo space 14 is established by a cargo bed of the pickup truck. For example, the cargo space 14 may generally be defined by side walls 16, a front wall 18, and a tailgate 20 that acts as a rear wall of the cargo bed when closed. However, other vehicle configurations are also contemplated within the scope of this disclosure. For example, the vehicle 10 could be configured as a car, a truck, a van, a sport utility vehicle (SUV), etc.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component or system.

The vehicle 10 may include one or more exportable power outlet boxes 22. Each exportable power outlet box 22 may be part of a remote power supply system (see FIG. 5) of the vehicle 10 that is configured for powering auxiliary devices 24 located external to/remote from the vehicle 10. The auxiliary devices 24 could be any electrically powered device, including but not limited to, extension cords, construction tools, powered lawn equipment, recreational devices, campers or trailers, etc. Each exportable power outlet box 22 may include one or more electrical power outlets 26 that provide an interface for connecting the auxiliary devices 24. A user can couple a plug 28 of the auxiliary device 24 to one of the electrical power outlets 26 for powering the auxiliary device 24 using power originating from the vehicle 10. The electrical power outlets 26 may include 120V outlet ports, 240V outlet ports, USB ports, etc., or any combination of these or other power outlet ports.

Each exportable power outlet box 22 provided on the vehicle 10 may be mounted to a surface 30 of the vehicle 10. The surface 30 could be located anywhere on the vehicle 10, including any location within either the passenger cabin 12 or the cargo space 14. In an embodiment, the surface 30 is established by one of the side walls 16 of the cargo bed of the vehicle 10. However, other configurations are further contemplated within the scope of this disclosure.

The vehicle 10 may further include a generator system 32, which may be part of a powertrain of the vehicle 10. The generator system 32 may be operably coupled to the exportable power outlet box 22 for supplying power to the electrical power outlets 26.

Figure 2:
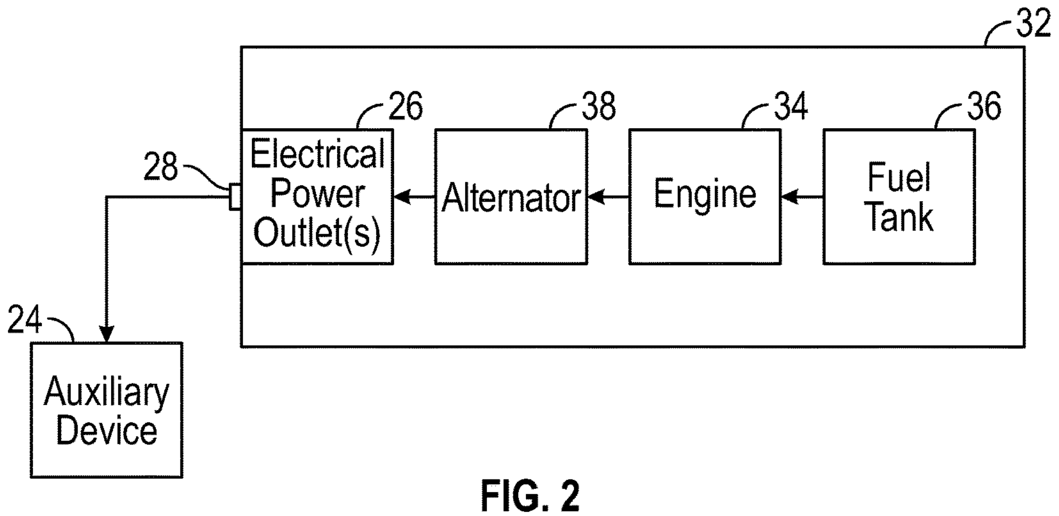
FIG. 2 schematically illustrates aspects of an exemplary generator system of a motor vehicle.

In implementations in which the vehicle 10 is a conventional motor vehicle, the generator system 32 may include an internal combustion engine 34, a fuel tank 36 for storing fuel (e.g., gasoline, diesel, etc.) that may be used to power the internal combustion engine 34, and an alternator 38 (see, e.g., FIG. 2). The alternator 38 may convert mechanical energy from the engine 34 into electrical energy that can be utilized to provide power to the electrical power outlets 26 of the exportable power outlet box 22 for powering the one or more auxiliary devices 24. In an embodiment, the alternator 38 is a 28 Volt alternator or battery, and operating the engine 34 can generate up to 10 Kilowatts of power through the alternator 38 that can be directed to the exportable power outlet box 22, such when operating the vehicle 10 in a power generation mode, for example.

Figure 3:
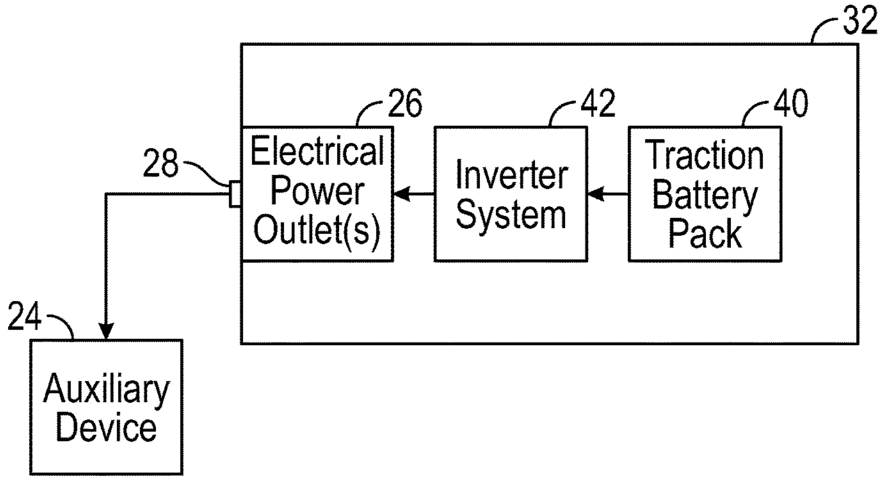
FIG. 3 schematically illustrates aspects of another exemplary generator system of a motor vehicle.

In implementations in which the vehicle 10 is a hybrid vehicle, the generator system 32 may include a traction battery pack 40 and an inverter system 42 (see, e.g., FIG. 3). The traction battery pack 40 may be configured as a high voltage traction battery pack that includes a plurality of battery arrays (i.e., battery assemblies or groupings of battery cells) capable of outputting electrical power. The inverter system 42 may enable the transfer of power from the traction battery pack 40 to the exportable power outlet box 22 for supplying power to the electrical power outlets 26 at the correct voltage and current levels for supporting the auxiliary devices 24. The power from the traction battery pack 40 could be supplied to the exportable power outlet box 22 instead of or in addition to power supplied by an internal combustion engine.

The exportable power outlet box 22 may further include a reel 44 and a cord 46 that may be wound and unwound relative to the reel 44. The cord 46 could include any length and/or wire gauge (e.g., 25 feet 14 AWG, 50 feet 12 AWG, 100 feet, 10 AWG, etc.). In an embodiment, the reel 44 is a spring-loaded flywheel that is capable of automatically winding the cord 46 onto the reel 44, such as via spring tension forces.

Figure 4:
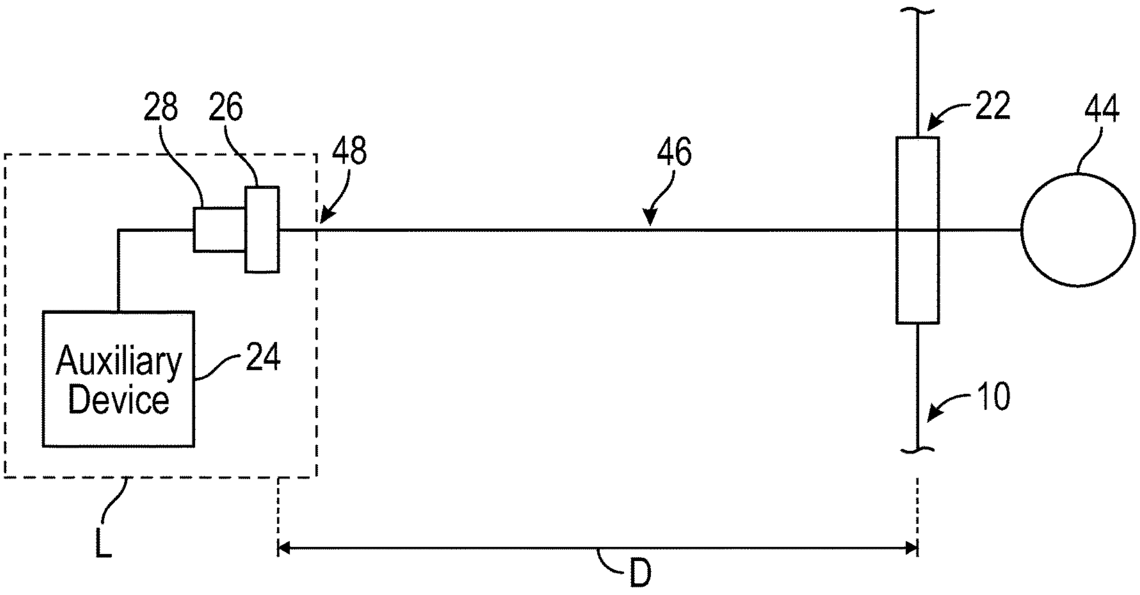
FIG. 4 schematically illustrates functionality associated with an exportable power outlet box of a motor vehicle.

Referring now to FIG. 4, an end portion 48 of the cord 46 may be connected to one or more of the electrical power outlets 26 of the exportable power outlet box 22. The electrical power outlet(s) 26 that are connected to the end portion 48 may be disengaged from the exportable power outlet box 22 and can then be pulled to a remote location L that is a distance D apart from the vehicle 10 by unwinding the cord 46 from the reel 44. The remote location L could, for example, be inside a building or any other structure that is generally inaccessible by the vehicle 10. The cord 46 may unwind from the reel 44 as the user moves further away from the vehicle 10. One or more auxiliary devices 24 can then be plugged into the electrical power outlets 26 for powering the auxiliary devices 24 at the remote location L without requiring the user to relocate the vehicle 10 all the way to or inside the remote location L.

In certain residential areas or other locales, quiet zones can exist that attempt to limit the effects of noise pollution on nearby people/buildings/areas of interest. Users may be unaware of relevant noise ordinances associated with quiet zones when operating their vehicles in the power generation mode. Further, users may not fully understand ways to reduce noise pollution while still maintaining the ability to operate in the power generation mode to perform necessary work-related tasks near the quiet zones. This disclosure is therefore directed to vehicle remote power supply systems that include features for minimizing noise pollution by reducing the realized sound levels origination from sound producing components (e.g., engine, tailpipe or other exhaust system components, fans or other HVAC components, etc.) of the vehicle 10 when operating the vehicle 10 in the power generation mode.

Figure 5:
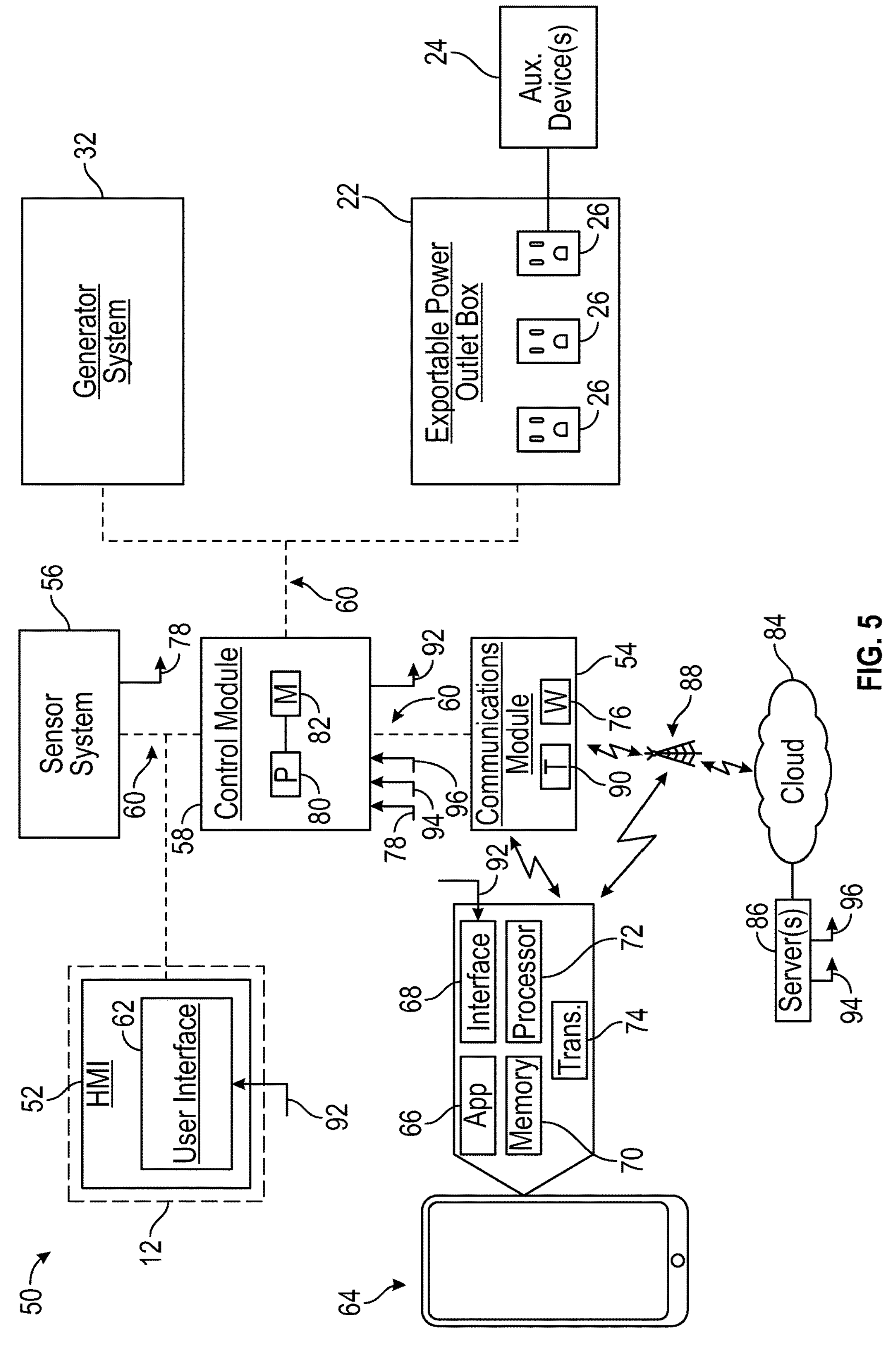
FIG. 5 schematically illustrates an exemplary remote power supply system for a motor vehicle.

FIG. 5, with continued reference to FIGS. 1-4, schematically illustrates a remote power supply system 50 that may be provided on the vehicle 10. The remote power supply system 50 may, for example, enable the vehicle 10 to operate in the power generation mode for powering one or more auxiliary devices 24 that are separate/remote from the vehicle 10. Moreover, as further explained below, the remote power supply system 50 may be further configured to control the vehicle 10 in a manner that is designed to minimize the amount of noise pollution realized at nearby areas of interest when certain preconditions exist during the power generation mode.

The remote power supply system 50 may include the exportable power outlet box 22, the generator system 32, a human machine interface (HMI) 52, a communications module 54, a sensor system 56, and a control module 58. These and various other components may be interconnected and in electronic communication with one another over one or more communication buses 60. The communication buses 60 may be wired communication buses such as a controller area network (CAN) bus, or wireless communication buses such as Wi-Fi, Bluetooth®, Ultra-Wide Band (UWB), etc.

The HMI 52 may be located within the passenger cabin 12 of the vehicle 10 and may include various user interfaces for displaying information to the vehicle occupants and for allowing the vehicle occupants to enter information into the HMI 52. The vehicle occupants may interact with the user interfaces via touch screens, tactile buttons, audible speech, speech synthesis, gesture recognition, etc. In an embodiment, the HMI 52 is part of an in-dash infotainment system of the vehicle 10. However, other configurations are further contemplated within the scope of this disclosure.

The HMI 52 may include one or more user interfaces 62 dedicated to functionality associated with the remote power supply system 50. The one or more user interfaces 62 may present power generation-related information to a user. Non-limiting examples of the type of power generation information that may be displayed within the user interfaces 62 include the amount of power being drawn from each electrical power outlet 26, the efficiency of the power transfer through the cord 46, identification of nearby areas of interest that may be susceptible to noise pollution, alerts related to the amount of noise pollution being generated during power generation mode, alerts for taking vehicle-specific actions designed to reduce the amount of noise pollution realized at the identified areas of interest, etc.

The vehicle user could alternatively or additionally interface with the remote power supply system 50 with a personal electronic device 64 (e.g., a smart phone, tablet, computer, wearable smart device, etc.). The personal electronic device 64 in most implementations belongs to the owner/user of the vehicle 10. The personal electronic device 64 may include an application 66 (e.g., FordPass™ or another similar application) that includes programming to allow the user to employ one or more user interfaces 68 for setting or controlling certain aspects of the remote power supply system 50. Power generation related information may be presented to the user within one or more of the user interfaces 68, such as when operating the vehicle 10 in power generation mode. The application 66 may be stored in a memory 70 of the personal electronic device 64 and may be executed by a processor 72 of the personal electronic device 64. The personal electronic device 64 may additionally include a transceiver 74 that is configured to communicate with the remote power supply system 50, such as via the communications module 54, for example.

The communications module 54 may be configured for achieving bidirectional communications between the remote power supply system 50 and the personal electronic device 64. For example, the communications module 54 may include one or more wireless devices 76 that is operable to facilitate communications between the user and the remote power supply system 50. The wireless devices 76 may be imbedded or otherwise mounted at various locations of the vehicle 10, such as within the front bumper, rack, molding, doors, in-vehicle components, etc. In an embodiment, the wireless devices 76 are Bluetooth® Low Energy (BLE) transceivers configured to receive and/or emit low energy signals as a way to detect and communicate with participating users. However, other types of wireless devices (e.g., WiFi, V2V, UWB, Cellular, etc.) are also contemplated within the scope of this disclosure.

The communications module 54 (and the personal electronic device 64) may be further configured to communicate over a cloud network 84 (i.e., the internet) to obtain various information stored on one or more servers 86. Each server 86 can identify, collect, and store user data associated with the vehicle 10 for validation purposes. Upon an authorized request, data may be subsequently transmitted to the communications module 54, via a cellular tower 88 or some other known communication technique (e.g., Wi-Fi, Bluetooth®, etc.). The communications module 54 may include a transceiver 90 for achieving bidirectional communication with the cellular tower 88. For example, the transceiver 90 can receive data from the servers 86 or can communicate data back to the servers 86 via the cellular tower 88. Although not necessarily shown or described in this highly schematic embodiment, numerous other components may enable bidirectional communications between the vehicle 10 and the web-based servers 86.

In an embodiment, the communications module 54 communicates with the servers 86 to obtain user history information 94 (e.g., location history, mode selection history, user settings history, etc.), noise restriction information 96 (e.g., local noise ordinance information, various times, locations, and acceptable noise levels associated with each specific time and location, etc.), etc. The data received by the communications module 54 from the servers 86 may be communicated to the control module 58 where it can be used in combination with other data to determine whether the vehicle 10 is located in a quiet zone where noise pollution emitted by the vehicle 10 should be limited, for example. This may be especially important when operating the vehicle 10 in power generation mode when it is located in a quiet zone.

The sensor system 56 may include various sensors and other components (e.g., cameras, etc.) that are capable of monitoring the environment in and around the vehicle 10, such as for monitoring/inferring when conditions may indicate a need for taking corrective actions for reducing the amount of noise pollution being generated by the vehicle 10 during power generation mode. For example, the sensor system 56 may include one or more of engine speed sensors, GPS sensors, forward, side, and rear-view cameras (such as part of a 360-degree camera system, for example), radar sensors, microphones, and/or various other sensors and components.

The sensor system 56 may include predictive sensors, reactive sensors, or both. Predictive sensors may analyze the environment around the vehicle 10 in order to determine whether conditions indicate the need to modify operation of the vehicle 10 in a manner that reduces noise pollution. Reactive sensors may detect specific conditions (e.g., person detected walking near the vehicle 10, etc.) that may warrant taking specific vehicle-specific actions for reducing noise pollution.

The sensor system 56 described above is intended to be exemplary only and thus could include a greater or fewer number of sensors and different types of sensors than those which have been mentioned. In addition, in this disclosure, any of the described sensors of the sensor system 56 could be configured as a single sensor or an arrangement of sensors or sensing devices adapted for a specific purpose(s).

The sensor system 56 may be configured to communicate sensor data 78 to the control module 58. As further explained below, the sensor data 78 may be analyzed by the control module 58 for determining if and when to perform remedial actions for reducing noise pollution created when operating the vehicle 10 in power generation mode.

The control module 58 may include both hardware and software and could be part of an overall vehicle control system, such as a vehicle system controller (VSC), or could alternatively be a stand-alone controller separate from the VSC. In an embodiment, the control module 58 is programmed with executable instructions for interfacing with and commanding operation of various components of the remote power supply system 50 as part of a strategy for reducing vehicle noise pollution when operating the vehicle 10 in power generation mode. Although shown as separate modules within the highly schematic depiction of FIG. 5, the HMI 52, the communications module 54, and the control module 58 could be integrated together as part of common module of the vehicle 10.

The control module 58 may include a processor 80 and non-transitory memory 82 for executing various control strategies and modes associated with the remote power supply system 50. The processor 80 may be a custom made or a commercially available processor, a central processing unit (CPU), or generally any device for executing software instructions. The memory 82 can include any one or combination of volatile memory elements and/or nonvolatile memory elements. The processor 80 may be operably coupled to the memory 82 and may be configured to execute one or more programs stored in the memory 82 based on various inputs received from other devices associated with the remote power supply system 50.

In an embodiment, the control module 58 may be programmed to determine when the vehicle 10 has entered into or is operating within a designated quiet zone. A quiet zone is any location where it is desirable to limit the amount of noise pollution output by the vehicle 10. The control module 58 may infer when the vehicle 10 has entered into a quiet zone based on the sensor data 78 received from the sensor system 56 (e.g., GPS data may indicate that a current or anticipated location is a residential area where vehicle noise should be limited). Alternatively, the quiet zone determination could be based on the noise restriction information 96 obtained from one of the servers 86. The control module 58 may determine whether the vehicle 10 is in a quiet zone each time it is parked and/or each time a trip destination that has been entered by the user has been reached.

The control module 58 may be further programmed to determine an intent of the user to operate the vehicle 10 in the power generation mode. This determination may be inferred based on the sensor data 78 (e.g., the sensor system 56 may identify tools in the cargo bed or plugged into the exportable power outlet box 22), and/or the user history information 94 obtained from one of the servers 86 (e.g., the user history may indicate that the user typically operates the vehicle 10 in power generation mode at specific locations, etc.). In another embodiment, the intent of the user to operate the vehicle 10 in the power generation mode may be based on a direct user input via the HMI 52 and/or the personal electronic device 64.

In another embodiment, the control module 58 may be programmed to identify one or more areas of interest that are located near the vehicle 10 within the designated quiet zone. Areas of interest may include people, buildings, windows, sidewalks, bridges, or other locations where it is desirable to limit the realized sound level originating from the vehicle 10 when the vehicle 10 is operating in the power generation mode. The control module 58 may be configured to make this determination based at least on the sensor data 78 received from the sensor system 56.

The control module 58 may be further programmed to assign a priority preference to each identified area of interest. For example, the control module 58 may assign a priority ranking score to each area of interest, with each assigned priority ranking score being a number (e.g., an integer) that represents a ranking of the order in which the vehicle sound footprint should be optimized relative to each area of interest while power generation mode is active. In an embodiment, the control module 58 may assign the highest sound mitigating priority to those areas of interest associated with local sound ordinances, then the next highest priority to pedestrians, then the next highest priority to residences, then the next highest priority to commercial buildings, then the next highest priority to other vehicles, and so on. However, other priority ranking preferences could be programmed within the scope of this disclosure.

In another embodiment, the user of the vehicle 10 may specifically assign his/her desired priority level to each identified area of interest. For example, the user may select his/her desired level of priority of each area of interest using the user interface 62 of the HMI 52 and/or the user interface 68 of the personal electronic device 64.

In another embodiment, the control module 58 may be programmed to determine the location and orientation of the vehicle 10 relative to the one or more areas of interest. This determination may include determining the distance between each sound producing component (e.g., engine, tailpipe, fans, etc.) of the vehicle 10 and each identified area of interest, determining the orientation (e.g., exhaust direction, engine location, fan location, etc.) of each sound producing component of the vehicle 10 relative to each area of interest, etc.

The control module 58 may be further programmed to analyze a surrounding area of the vehicle 10 for identifying sound absorbing textures/shapes/objects. For example, the control module 58 may be configured to analyze the sensor data 78 in order to distinguish between sound absorbing objects (e.g., grass, bushes, etc.) and sound reflecting objects (e.g., cement, wood, etc.).

The control module 58 may be further programmed to determine the expected sound contribution of each sound generating component of the vehicle 10 relative to each identified area of interest. This determination may include referencing pre-developed sound maps (e.g., saved in the memory 82) for each sound generating component of the vehicle 10. If sound maps are not predeveloped, the sensor system 56 (e.g., microphones thereof) may be used to estimate the current level of sound emanating from each sound generating component of the vehicle 10.

The control module 58 may be further programmed to command one or more vehicle-specific actions for reducing the realized sound level experienced at each area of interest when operating the vehicle 10 in power generation mode. In an embodiment, the vehicle-specific actions may include reorienting the vehicle 10 so that its position is altered relative to each area of interest. For example, the vehicle 10 may be reoriented so that the noise producing component or components contributing the most noise pollution is/are repositioned to face away from the identified areas of interest and according to assigned priority levels. The vehicle 10 could also be reoriented by moving further away from the areas of interest and/or by positioning the vehicle 10 over sound absorbing objects as opposed to sound reflecting objects.

Figure 6A:
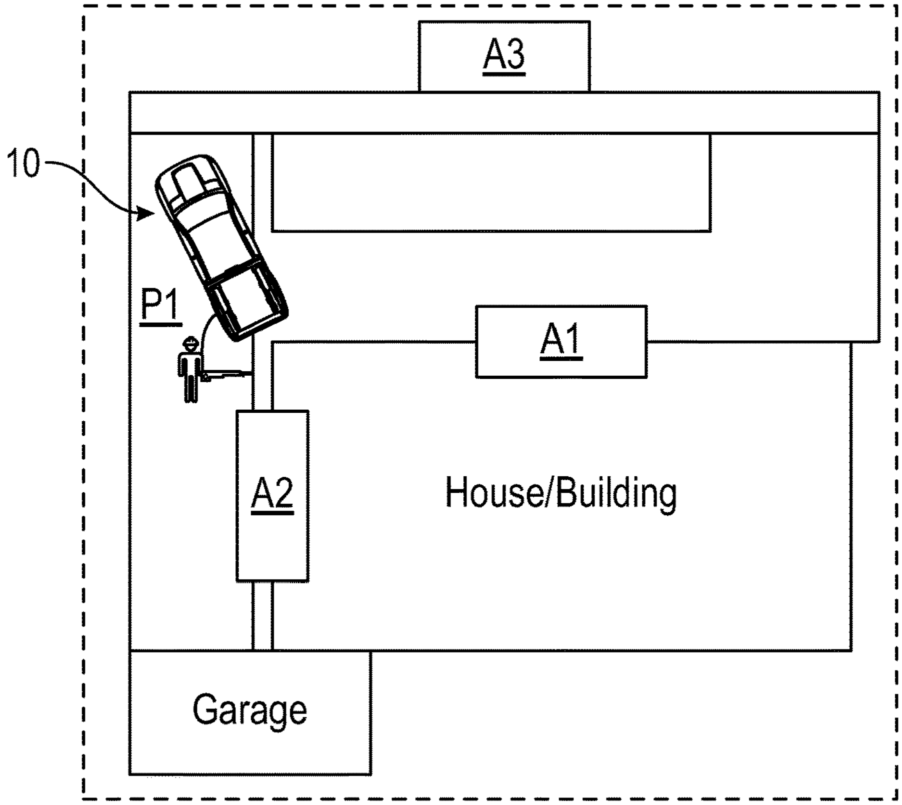
FIGS. 6A and 6B schematically illustrate reorienting a vehicle as part of a control strategy for limiting vehicle sound pollution relative to one or more areas of interest near the vehicle.
Figure 6B:
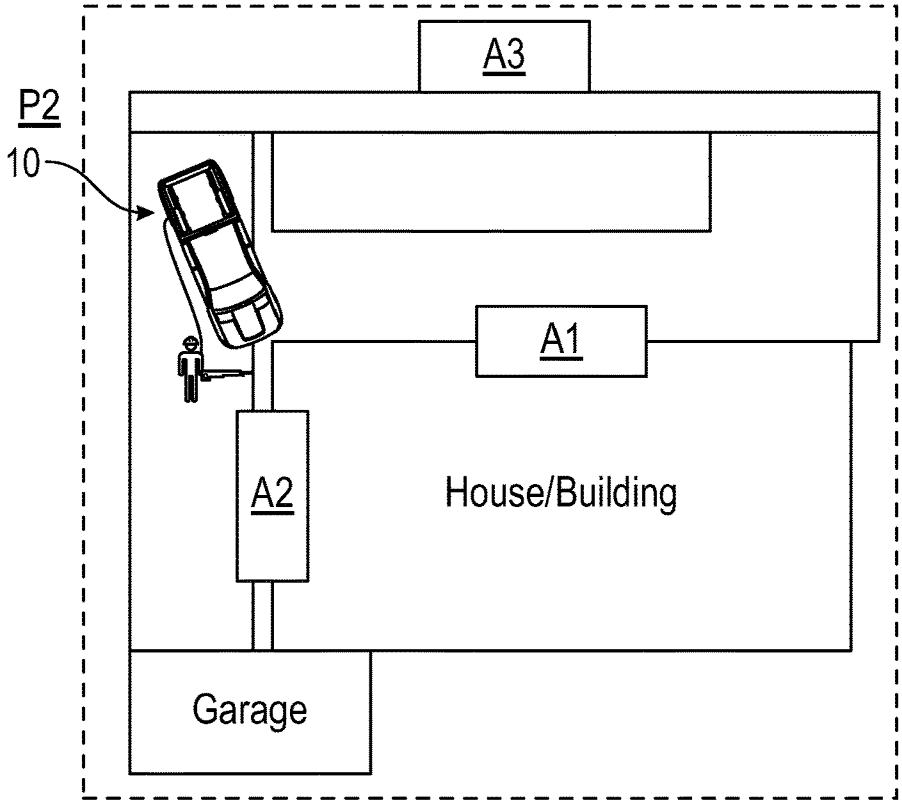

The command to reorient the vehicle 10 may be part of either an automated control strategy or an instruction-based control strategy. For example, if the vehicle 10 is equipped with autonomous driving features, the control module 58 may automatically control the vehicle 10 to autonomously reorient itself relative to the identified and ranked areas of interest when conditions indicate the need to do so. FIGS. 6A and 6B schematically illustrate such a scenario. The vehicle 10 may begin parked in a first position P1 relive to a first area of interest A1, a second area of interest A2, and a third area of interest A3. In this embodiment, the first area of interest A1 may be a front door of a house/building and may have the highest priority ranking, the second area of interest A2 may be a side door of the housing/building and may have the second highest priority ranking, and the third area of interest A3 may be a sidewalk and may have the lowest priority ranking.

Once the sound contribution from each sound generating component of the vehicle 10 has been determined, the vehicle 10 may be autonomously repositioned/moved to a second position P2 that is displaced from the first position P1. The sound generating components of vehicle 10 may face away from and/or be moved further away from the areas of interest A1, A2, A3 when in the second position P2, thereby reducing the sound levels realized at each of the areas of interest A1, A2, and A3.

Alternatively, the control module 58 may be configured to instruct the user to reorient the vehicle 10 by commanding an alert 92 to the user. The alert 92 may instruct the user of the need to reorient the vehicle 10 relative to one or more areas of interest. The alert 92 may take the form of one or more messages that can be displayed on the user interfaces 62 of the HMI 52 and/or the user interface(s) 68 of the personal electronic device 64. The alert 92 may further include prompts that are designed to properly position and/or orient the vehicle 10 relative to each area of interest.

In other embodiments, the noise-reducing vehicle-specific action commanded by the control module 58 may include shutting off the engine 34, such as when pedestrians are passing by, for example. In another embodiment, the noise-reducing action commanded by the control module 58 may include reducing the speed of the engine 34, modifying a charge rate of the traction battery pack 40, and/or temporarily pulling power from the traction battery pack 40 in place of or in addition to the power being pulled from the engine 34 during power generation mode.

In another embodiment, the noise-reducing action commanded by the control module 58 may include modifying the valve timing, spark timing, and/or air-to-fuel ratio of the engine 34 during the power generation mode. In another embodiment, the noise-reducing action commanded by the control module 58 may include momentarily reducing vehicle HVAC loads, such as by load shedding. Various other vehicle-specific actions that result in less noise pollution may also be commanded by the control module 58 within the scope of this disclosure.

Notably, if the noise pollution generated by the vehicle 10 is below a predefined threshold level, the control module 58 may control the vehicle 10 in the power generation mode without any restrictions.

Figure 7:
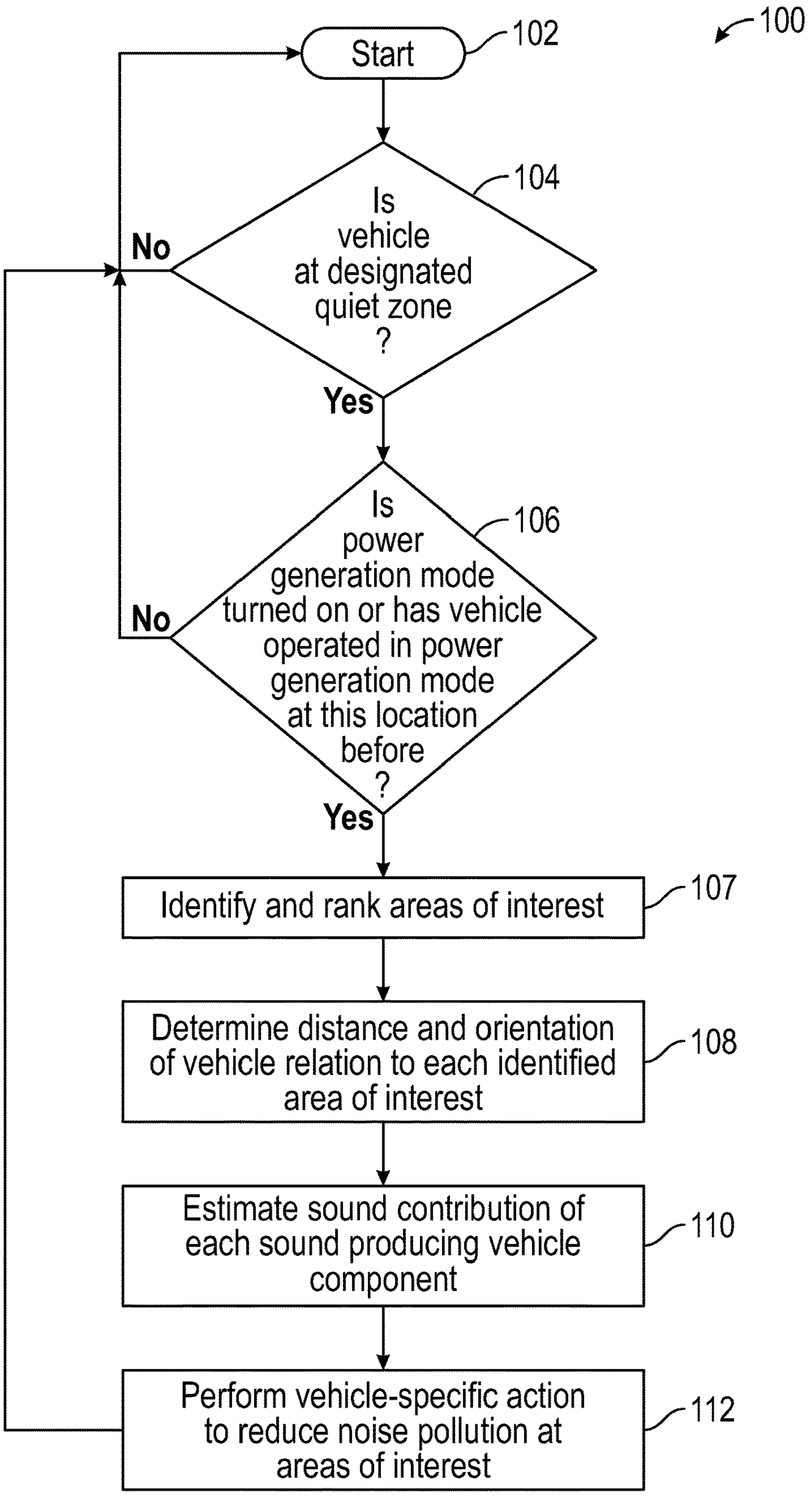
FIG. 7 schematically illustrates an exemplary method for controlling a vehicle in a manner that reduces an amount of vehicle sound pollution realized at one or more areas of interest near the vehicle.

FIG. 7, with continued reference to FIGS. 1-6B, schematically illustrates an exemplary method 100 for controlling the vehicle 10 in order to limit the level of vehicle source sound pollution realized at one or more areas of interest near the vehicle 10. The method 100 may include a greater or fewer number of steps than recited below, and the exact order of the steps is not intended to limit this disclosure.

The remote power supply system 50 may be configured to employ one or more algorithms adapted to execute the steps of the exemplary method 100. For example, the method 100 may be stored as executable instructions in the memory 82 of the control module 58, and the executable instructions may be embodied within any computer readable medium that can be executed by the processor 80 of the control module 58.

The method may begin at block 102. At block 104, the method 100 may determine whether the vehicle 10 is located within a designated quiet zone. The quiet zone could be a residential area or any other area designated as a quiet zone by one or more local ordinances, laws, etc.

If the vehicle 10 is determined to be in a quiet zone, the method 100 may proceed to block 106. At this step, the method 100 may determine whether the vehicle 10 is or is expected to operate in the power generation mode while being located in the quiet zone. This may include identifying whether power generation mode is turned on or whether the vehicle 10 has operated in power generation mode at this location before.

If a YES flag is returned at block 106, the method may identify and rank each area of interest (e.g., people, buildings, windows, sidewalks, bridges, etc.) near the current location at block 107. The method 100 may then determine a distance and an orientation of the vehicle 10 relative to the one or more identified areas of interest surrounding the vehicle 10 at block 108. This step may include things such as determining the distance between each sound producing component (e.g., engine, tailpipe, fans, etc.) of the vehicle 10 and each area of interest, determining the orientation (e.g., exhaust direction, engine location, fan location, etc.) of each sound producing component of the vehicle 10 relative to each area of interest, identifying any sound absorbing textures/shapes/objects, near the vehicle 10, etc.

Next, at block 110, the method 100 may estimate the relative total sound contribution of each sound producing component of the vehicle 10 based on its current or expected operating conditions during the power generation mode. Finally, the method 100 may perform one or more vehicle-specific actions designed to reduce the realized vehicle source sound level experienced at each area of interest at block 112. The one or more actions may include but are not limited to repositioning/reorienting the vehicle 10 relative to the areas of interest, modifying operation of the engine 34 and/or traction battery pack 40 of the vehicle 10, modifying operation of one or more components associated with an HVAC system of the vehicle 10, etc.

Modifying the operation of the engine 34 may include altering engine torque and/or speed, which can change the frequency and the amplitude of engine-based noise (but at the potential expense of fuel efficiency). Using high voltage power from the traction battery pack 40 instead of engine power can temporarily reduce engine noise until the energy of the traction battery pack 40 is depleted and the engine power must support the exportable power load and begin to recharge the traction battery pack 40 to allow a future quiet period of operation. The rate of charging of the traction battery pack 40 can also impact the noise emitted by the engine 34 (e.g., a higher engine torque at a given speed increases the charging rate of the traction battery pack 40 and the noise emitted from the vehicle 10).

Modifying operation of the HVAC system may include reducing operation of one or more HVAC system components. The HVAC system of vehicle 10 can generate noise external to the vehicle 10 through the operation of the A/C compressor and the powertrain cooling fan, which is typically used to cool the A/C condenser. Reducing A/C performance of the HVAC system reduces noise by slowing or stopping the A/C compressor, and the reduced compressor activity reduces the need for cooling fan operation, thereby further reducing noise contribution.

The method 100 may then return to block 104. The method 100 may thus be part of a closed-loop methodology that is designed to continuously re-evaluate the conditions of the vehicle 10 in an effort to mitigate sound pollution during operation of the vehicle 10.

The vehicle remote power supply systems of this disclosure may provide exportable power outlet boxes for powering devices separate from the vehicle when operating the vehicle in a power generation mode. When the vehicle is expected to be operated in the power generation mode, the vehicle may be controlled, such as by repositioning the vehicle relative to nearby areas of interest, thereby reducing the realized level of vehicle source noise for each area of interest around the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A motor vehicle, comprising:

a power outlet box including an electrical power outlet;

a generator system configured to power the electrical power outlet during a power generation mode of the motor vehicle; and a control module programmed to command a vehicle-specific action for reducing an amount of noise pollution realized at an area of interest near the motor vehicle during the power generation mode, the vehicle-specific action including autonomously reorienting the motor vehicle to a position that is altered relative to the area of interest, the control module programmed to command the vehicle-specific action by at least one of directly commanding the motor vehicle to perform the autonomous reorientation, or issuing an alert to a user of the motor vehicle to initiate the autonomous reorientation, wherein the area of interest comprises a specific location external to the motor vehicle at which the noise pollution originating from the motor vehicle is realized as a function of at least a distance between the motor vehicle and the area of interest and an orientation of the motor vehicle relative to the area of interest.

2. The motor vehicle as recited in claim 1, wherein the electrical power outlet is movable to a location away from the motor vehicle by unwinding a cord of the power outlet box.

3. The motor vehicle as recited in claim 1, comprising a sensor system configured to monitor an environment around the motor vehicle.

4. The motor vehicle as recited in claim 3, wherein the sensor system is configured to provide sensor data to the control module for determining when to perform the vehicle-specific action.

5. The motor vehicle as recited in claim 4, wherein the control module is further programmed to determine when the motor vehicle has entered into or is operating within a designated quiet zone based at least on the sensor data.

6. The motor vehicle as recited in claim 5, wherein the control module is further programmed to determine when the motor vehicle has entered into or is operating within the designated quiet zone based at least on noise restriction information received from a web-based server.

7. The motor vehicle as recited in claim 5, wherein the control module is further programmed to determine whether the motor vehicle is operating in the power generation mode or whether the motor vehicle has previously operated in the power generation mode at a current location when the motor vehicle is located within the designated quiet zone.

8. The motor vehicle as recited in claim 5, wherein the control module is further programmed to identify the area of interest within the designated quiet zone based at least on the sensor data.

9. The motor vehicle as recited in claim 5, wherein the control module is further programmed to analyze the sensor data in order to distinguish between a sound absorbing object and a sound reflecting object located within the environment.

10. The motor vehicle as recited in claim 1, wherein the control module is further programmed to determine a location and the orientation of the motor vehicle relative to the area of interest.

11. The motor vehicle as recited in claim 10, wherein the control module is further programmed to determine an expected sound contribution of a sound generating component of the motor vehicle relative to the area of interest.

12. The motor vehicle as recited in claim 11, wherein reorienting the motor vehicle to the position that is altered relative to the area of interest includes positioning the sound generating component to face in a direction away from the area of interest.

13. The motor vehicle as recited in claim 1, wherein reorienting the motor vehicle to the position that is altered relative to the area of interest includes moving the motor vehicle to a location that is further away from the area of interest.

14. The motor vehicle as recited in claim 1, wherein the vehicle-specific action includes modifying an operation of an engine or a traction battery pack of the motor vehicle during the power generation mode.

15. The motor vehicle as recited in claim 1, wherein the vehicle-specific action includes modifying an operation of a heating, ventilation, and air conditioning (HVAC) system of the motor vehicle during the power generation mode.

16. The motor vehicle as recited in claim 1, wherein reorienting the motor vehicle includes moving the motor vehicle to face away from the area of interest.

17. The motor vehicle as recited in claim 1, wherein reorienting the motor vehicle includes positioning the motor vehicle over a sound absorbing object as opposed to a sound reflecting object.

18. A motor vehicle, comprising:

a power outlet box including an electrical power outlet;

a generator system configured to power the electrical power outlet during a power generation mode of the motor vehicle; and a control module programmed to command an autonomous reorientation of the motor vehicle relative to an area of interest in a manner that reduces an amount of noise pollution realized at the area of interest when the motor vehicle is operating in a designated quiet zone, wherein the area of interest comprises a specific location external to the motor vehicle at which the noise pollution originating from the motor vehicle is realized as a function of at least a distance between the motor vehicle and the area of interest and an orientation of the motor vehicle relative to the area of interest.

19. A method, comprising:

controlling a motor vehicle, via a control module of a remote power supply system, to generate power for powering an auxiliary device separate from the motor vehicle; and controlling the motor vehicle, via the control module, to perform a vehicle-specific action for reducing an amount of noise pollution realized at an area of interest located near the motor vehicle, the area of interest comprising a specific location external to the motor vehicle at which the noise pollution originating from the motor vehicle is realized as a function of at least a distance between the motor vehicle and the area of interest and an orientation of the motor vehicle relative to the area of interest, wherein the vehicle-specific action includes autonomously reorienting the motor vehicle relative to the area of interest or modifying an operation of a traction battery pack of the motor vehicle.

20. The method as recited in claim 19, wherein modifying the operation of the traction battery pack includes adjusting a rate of charging of the traction battery pack or utilizing power from the traction battery pack in place of or instead of power from an engine of the motor vehicle.

* * * * *